Figure 1:
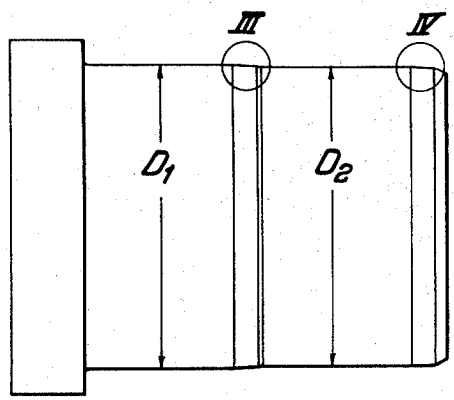

March 1, 1960 E. MAASS 2,926,940
ARRANGEMENT OF A PRESS CONNECTION OF A CYLINDRICAL INNER PART
AND AN OUTER PART, E.G. A SHAFT AND A HUB, TO BE JOINED OR
DISCONNECTED BY MEANS OF PRESSURE FLUID
Filed Dec. 21, 1956

Inventor:
EBERHARD MAASS
BY Karl F. Ross
AGENT

United States Patent Office 2,926,940
Patented Mar. 1, 1960

2,926,940

ARRANGEMENT OF A PRESS CONNECTION OF A CYLINDRICAL INNER PART AND AN OUTER PART, e.g. A SHAFT AND A HUB, TO BE JOINED OR DISCONNECTED BY MEANS OF PRESSURE FLUID

Eberhard Maass, Berlin-Haselhorst, Germany

Application December 21, 1956, Serial No. 629,975

7 Claims. (Cl. 287—53)

In order to facilitate assembly and disassembly of longitudinal press-fit connections between an outer and an inner element, e.g. a machine element and a shaft carrying the latter, it is known to introduce a pressure fluid, particularly pressure oil, between the seating faces whereby the seating faces are forced to separate. For this purpose, one of the two elements is provided with one or a plurality of supply channels for the pressure fluid opening into the seating surface or into an annular recess of the seating surface.

In the manufacture of press connection of the prior art with cylindrical seats, difficulties are encountered in that an introduction of the pressure fluid in producing the press connection is possible only when the inner part has been driven already to such an extent into the outer part that the annular channel for the pressure fluid is closed. In separating the parts, it is possible to feed the pressure fluid only until the pressure-fluid channel is released by the inner part. It is not possible, consequently, to increase materially the oversize of the diameter of the inner part relative to the bore of the outer part than without the use of a pressure fluid. Various proposals, therefore, have been made already to eliminate these difficulties. For instance, one proposal provides for the use of an auxiliary plug for the assembly of such press connections, this plug having a certain oversize relative to the bore of the outer part and a certain undersize relative to the inner part to be inserted into the bore. By this means it is possible to make the oversize of the part to be inserted larger than would be possible without such auxiliary plug which first is driven into the bore to the extent that the oil-supply channels are closed. By introducing pressure oil into the press-fit surface, the outer part is expanded so that also the inner part may be inserted by which, simultaneously, the auxiliary plug is expelled from the bore on the other side. Such arrangement, however, is comparatively cumbersome and not adaptable everywhere.

The invention now provides an arrangement which enables to obtain higher press oversizes up to the full utilization of the strength of the material without requiring special auxiliary means.

The invention comprises an axial division of the press-fit surface into two preferably equal portions having somewhat differing diameters. The supply channels for the pressure fluid are positioned so that they open between the two axially spaced portions of the seating surface. If desired, there may be provided between the two portions of the seating surface, e.g. by turning out the outer part in a manner known per se, an annular recess adapted to receive the pressure fluid and communicating with the feed channel.

The leading ends of the two fitting surfaces of the inner part terminate in short, slightly tapered transition zones preferably of equal length and taper.

A press-fit connection with an arrangement according to the invention is made by first passing the inner part with the press-fit surface of smaller diameter through the portion of the bore of the outer part of larger diameter up to the shoulder of the bore. The tapered transition zones having a small gradient and forming the transition to the two seats of the inner part of different diameters then seal the pressure-fluid channel, so that pressure fluid may be forced into the press-fit surface already from the beginning of the assembling operation. The bore of the outer part is thereby expanded somewhat in a known manner. In response to axial pressure, the outer part slides further onto the transition zones until the inner diameters of the outer part are widened to such an extent that it is possible to join the cylindrical seats. The operation may be performed so that the fluid pressure from the outside is maintained at a predetermined constant height during the entire insertion step. However, particularly with greater diameter differences of the stepped seats, it is also possible to close the feed channel from the outside after having introduced initially a certain quantity of pressure fluid. During the further pressing of the inner part into the bore of the outer part, the space enclosed between the two shoulders of the press-fit surface containing the pressure fluid is progressively reduced, whereby the pressure of the fluid is increased and an increasing separation of the press-fit surfaces is caused.

Figure 2:
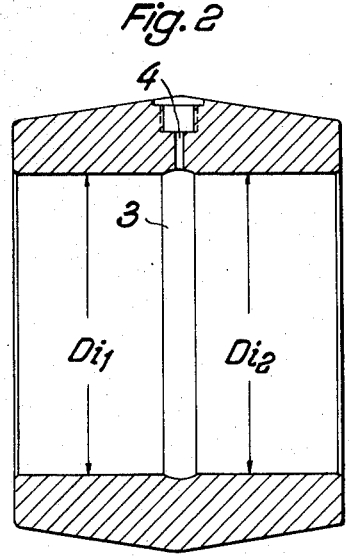
Figure 3:
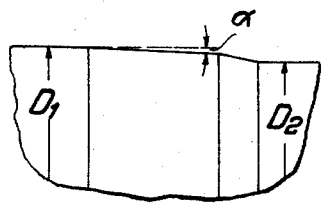
Figure 4:
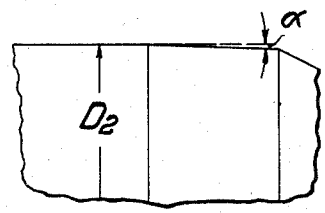

For illustration of the invention, the drawing is referred to which shows in Fig. 1 a male member such as the trunnion of a shaft in view and in Fig. 2, in cross-section, a female member such as a hub of a machine element to be pressed onto this shaft. Figs. 3 and 4 show enlarged sections of the zones III and IV of Fig. 1.

According to the invention, the seating surfaces of the shaft (Fig. 1) and the hub (Fig. 2) are divided into two portions of approximately equal length; the diameter $D_1$ of the trunnion is slightly larger than its diameter $D_2$ and, accordingly, the diameter $Di_1$ of one portion of the bore of the hub is larger by the same amount than the diameter $Di_2$ of the other portion of this bore. The oversize $D_1-Di_1$ of the first seating surface is equal to the oversize $D_2-Di_2$ of the second seating surface, while $D_2$ is slightly smaller than $Di_1$, whereby the leading portion of the trunnion of the shaft may be inserted without difficulties into the portion of the hub having the larger bore. An annular channel 3 is provided between the two portions of the hub bore in a manner known per se, a supply channel 4 opening into said annular channel for supplying the pressure fluid.

Figs. 3 and 4 show the slightly tapered intermediate and terminal zones provided at the leading ends of the two seating surfaces of the shaft. These tapered zones, the lengths and gradients (designated by the angle α) of which preferably are equal, serve to seal the pressure-fluid space and to cause gradual expansion of the outer part to the respective oversize of the inner part during the pressing operation.

I claim:

1. In combination, a generally cylindrical male member and a female member press-fitted together; said female member being provided with a generally cylindrical bore subdivided into a first and a second cylindrical bore section of respectively greater and less diameter axially spaced from each other; said male member being subdivided into a first and a second cylinder section of respectively less and greater diameter axially spaced from each other and received in said second and first bore sections, respectively; one of said members being provided at the free end of its first section with a tapered terminal section facilitating the introduction of said first cylinder section into said first bore section in the separated condition of said members; one of said members being provided with an annular channel separating its sections and with a pressure-fluid-supply passage communicating with said channel; the other of said members being provided with a slightly tapering intermediate section forming a transition zone between its first and second sections; said first bore section and said first cylinder section being of the same effective axial length.

2. The combination according to claim 1, wherein said intermediate section and said terminal section are of substantially the same axial length and taper.

3. The combination according to claim 1 wherein said annular channel is provided on said female member, said tapering intermediate section being formed on said male member opposite and substantially co-extensive with said annular channel.

4. In combination, a generally cylindrical male member subdivided into a first and a second cylinder section of respectively less and greater diameter axially spaced from each other; a female member provided with a generally cylindrical bore subdivided into a first and a second cylindrical bore section of respectively greater and less diameter axially spaced from each other, said first cylinder section being receivable in said first bore section and being of the same effective axial length as the latter; one of said members being provided at the free end of its first section with a tapered terminal section facilitating the introduction of said first cylinder section into said first bore section; one of said members being provided with an annular channel separating its sections and with a pressure-fluid-supply passage communicating with said channel; the other of said members being provided with a slightly tapering intermediate section forming a transition zone between its first and second sections; said first and second cylinder sections being introduceable into said second and first bore sections, respectively, only upon a widening of said female member by the admission of pressure fluid into said channel in a position of interengagement of said first sections in which said members are in contact along said tapered sections in a manner sealing off said first bore section against the escape of said fluid.

5. The combination according to claim 4, wherein the axial lengths of said bore sections and of said cylinder sections are all substantially identical, said annular channel being located on said female member intermediate said first and second bore sections and being substantially of the same axial length as said transition zone.

6. The combination according to claim 4, wherein said intermediate section and said terminal section are of substantially the same axial length and taper, their axial length being substantially less than that of said bore sections and of said cylinder sections.

7. A method of making a press-fit connection between a generally cylindrical male member, axially subdivided into a first and a second cylinder section of respectively less and greater diameter, and a female member provided with a generally cylindrical bore axially subdivided into a first and a second cylindrical bore section of respectively greater and less diameter smaller than the diameters of said second and first cylinder sections, respectively, said first bore section being adapted to receive said first cylinder section and being of the same effective axial length as the latter whereby annular zones of said male member axially abut respective annular zones of said female member upon the introduction of said first cylinder section into said first bore section, one of said members being provided with an annular channel separating its sections and with a pressure-fluid-supply passage communicating with said channel; said method comprising the steps of plugging both ends of said first bore section by fully introducing said first cylinder section into same beyond said channel, forcing a fluid under pressure through said passage and said channel into said first bore section, thereby expanding said female member sufficiently to admit said first cylinder section into said second bore section and said second cylinder section into said first bore section, and maintaining the pressure of said fluid while completing the introduction of said male member into said female member.

References Cited in the file of this patent

UNITED STATES PATENTS

| 2,084,439 | Hamer | June 22, 1937 |
| 2,762,112 | Kylen | Sept. 11, 1956 |
| 2,832,653 | Wilson | Apr. 29, 1958 |

FOREIGN PATENTS

| 599,251 | Great Britain | Mar. 9, 1948 |
| 599,304 | Great Britain | Mar. 9, 1948 |